(12) United States Patent
Eswaran et al.

(10) Patent No.: US 10,746,851 B2
(45) Date of Patent: Aug. 18, 2020

(54) CIRCUITS AND METHODS FOR DETERMINING CHIRP SIGNAL LINEARITY AND PHASE NOISE OF A FMCW RADAR

(71) Applicant: Texas Instruments Incorporated, Dallas, TX (US)

(72) Inventors: Anjan Prasad Eswaran, Bangalore (IN); Shankar Ram Narayanamoorthy, Bangalore (IN); Sreekiran Samala, Plano, TX (US); Karthik Subburaj, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 928 days.

(21) Appl. No.: 14/975,416

(22) Filed: Dec. 18, 2015

(65) Prior Publication Data
US 2017/0176574 A1    Jun. 22, 2017

(51) Int. Cl.
*G01S 7/40* (2006.01)
*G01S 13/34* (2006.01)
*G01S 7/35* (2006.01)

(52) U.S. Cl.
CPC .......... *G01S 7/4008* (2013.01); *G01S 13/343* (2013.01); *G01S 2007/358* (2013.01)

(58) Field of Classification Search
CPC . G01S 13/343; G01S 2007/358; G01S 7/4008
USPC ......................................................... 342/173
See application file for complete search history.

(56) References Cited

U.S. PATENT DOCUMENTS

| | | | |
|---|---|---|---|
| 5,252,981 A | 10/1993 | Grein et al. | |
| 5,376,938 A | 12/1994 | Martinez et al. | |
| 5,964,132 A | 10/1999 | chen | |
| 6,091,356 A * | 7/2000 | Sanders | G01S 7/282 331/1 R |
| 6,624,780 B1 * | 9/2003 | Fouts | G01S 7/38 342/14 |
| 6,922,555 B1 * | 7/2005 | Mohindra | H03D 1/2245 455/207 |
| 7,061,998 B1 * | 6/2006 | Rodgers | H03D 3/007 375/334 |
| 8,687,736 B1 * | 4/2014 | Huynh | H03D 3/007 375/322 |

(Continued)

FOREIGN PATENT DOCUMENTS

DE    10 2013 207 464    10/2014

OTHER PUBLICATIONS

Steffen Heuel, "Automated Measurements of 77 GHz FMCW Radar Signals Application Note", May 5, 2014, XP055603626, Retrieved from the Internet: URL:https://scdn.rohde-schwarz.com/ur/pws/dl_downloads/dl_applciation/application_notes/1ef88/1EF88_0e_Automated_Measurements_of_77_GHz_FMCW_Radar.pdf (retrieved on Jul. 9, 2019).

(Continued)

*Primary Examiner* — Timothy X Pham
(74) *Attorney, Agent, or Firm* — Ronald O. Neerings; Charles A. Brill; Frank D. Cimino

(57) ABSTRACT

A testing device for FMCW radar includes an input for receiving a chirp signal generated by the radar. An IQ down-converter coupled to the input down-converts the chirp signal. A digitizer extracts digitized IQ signals from the down-converted chirp signal. A processor coupled to the digitizer determines at least one of frequency linearity and phase noise of the chirp signal.

31 Claims, 4 Drawing Sheets

(56) References Cited

U.S. PATENT DOCUMENTS

| | | | |
|---|---|---|---|
| 2004/0150548 A1* | 8/2004 | Walmsley | G01S 7/35 |
| | | | 342/70 |
| 2005/0273320 A1* | 12/2005 | Yamaguchi | G01R 23/16 |
| | | | 704/205 |
| 2006/0023813 A1* | 2/2006 | Jaffe | H03D 3/009 |
| | | | 375/327 |
| 2007/0026831 A1* | 2/2007 | Jaffe | H04B 1/0014 |
| | | | 455/260 |
| 2008/0088503 A1 | 4/2008 | Beasley | |
| 2008/0122427 A1 | 5/2008 | Wagner | |
| 2009/0224963 A1 | 9/2009 | Nakanishi | |
| 2011/0227785 A1* | 9/2011 | Sakurai | G01S 13/345 |
| | | | 342/200 |
| 2012/0108188 A1* | 5/2012 | Matsumoto | H03F 1/0211 |
| | | | 455/118 |
| 2016/0020795 A1* | 1/2016 | Nadiri | H04L 27/34 |
| | | | 375/350 |
| 2016/0041221 A1* | 2/2016 | Forstner | G01R 31/3187 |
| | | | 324/750.3 |
| 2017/0031005 A1* | 2/2017 | Jaeger | H04L 27/36 |

OTHER PUBLICATIONS

Geoffrey M. Garner, Huawei Technologies co., et al., "Further Analysis of RMS frequency Offset for a CPRI Client Transported over OTN:C 972", ITU-T Draft; Study Period 2009-2102, International Telecommunication Union, Geneva, CH, vol. 13/15, May 19, 2010, pp. 1-11, XP017447665 (retrieved on May 19, 2010).

\* cited by examiner

US 10,746,851 B2

CIRCUITS AND METHODS FOR DETERMINING CHIRP SIGNAL LINEARITY AND PHASE NOISE OF A FMCW RADAR

BACKGROUND

FMCW (Frequency Modulated Continuous Wave) radars are systems that transmit a continuous wave, which modulates a periodic function such as a sine wave or saw-tooth waveform. The main constituent of a FMCW radar is the chirp signal or waveform. A chirp signal is a signal whose frequency increases or decreases with time. The chirp signal has to be extremely linear in order to avoid phase distortion effects seen at the receiver of the radar.

The radars have a loop filter in their local oscillator (LO) subsystems that is optimized for continuous wave phase noise, but may not be optimal for a dynamic phase noise. Dynamic phase noise is the term used to refer to the phase noise that is associated with a chirp signal that is being transmitted over a certain bandwidth. The measurements of frequency linearity and dynamic phase noise are important in FMCW radars because they determine the purity of the waveform of the chirp signal transmitted by the radars.

The current solution involves the use of test equipment to measure the frequency linearity and phase noise. However, most test equipment is expensive and time consuming to use. The more affordable test equipment typically does not have the bandwidth to measure the frequency linearity and/or they do not have the capability to operate on a wider chirp signal bandwidth to measure dynamic phase noise.

SUMMARY

A testing device for FMCW radar includes an input for receiving a chirp signal generated by the radar. An IQ down-converter coupled to the input down-converts the chirp signal. A digitizer extracts digitized I and Q signals from the down-converted chirp signal. A processor coupled to the digitizer determines at least one of frequency linearity and phase noise of the chirp signal.

DETAILED DESCRIPTION

Figure 1:
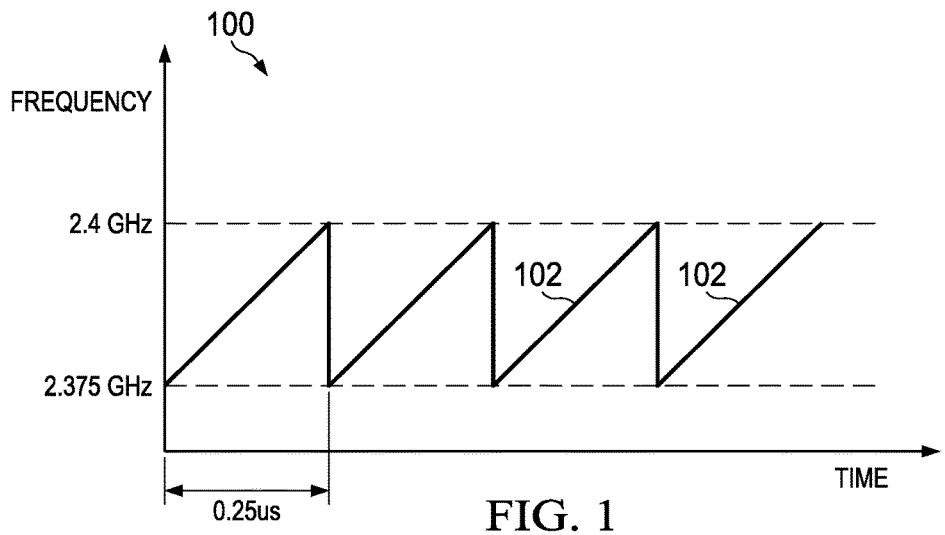
FIG. 1 is a graph showing an example of a chirp signal as a function of time.

Circuits and methods that validate frequency linearity and dynamic phase noise of frequency modulated continuous wave (FMCW) radars are disclosed herein. Frequency linearity is the linearity of a chirp signal transmitted by a radar. Dynamic phase noise is the term used to refer to the phase noise that is measured when a chirp signal is being transmitted over a certain bandwidth. The circuits and methods are described below based on an exemplary chirp signal having a waveform with the following parameters:

transmitted chirp signal bandwidth: 0.025 GHz
chirp start frequency: 2.375 GHz
chirp stop frequency: 2.4 GHz
slope rate: 1000 MHz/us FIG. 1 is a graph showing an example of a chirp signal 100 as a function of time that has the above described parameters. The chirp signal 100 repeats continuously, starts at a start frequency of 2.375 GHz, and ends at a stop frequency of 2.4 GHz. The frequency rise between the start frequency and the stop frequency corresponds to the portion of the chirp signal 100 where frequency linearity is measured. More specifically, a slope rate that is constant between the start frequency and the stop frequency along a line 102 corresponds to a chirp signal that has high frequency linearity. If the line 102 is curved or has discontinuities, the chirp signal has low frequency linearity. Thus, the straightness of the line 102 plotted between the start frequency and the stop frequency is related to the frequency linearity.

Figure 2:
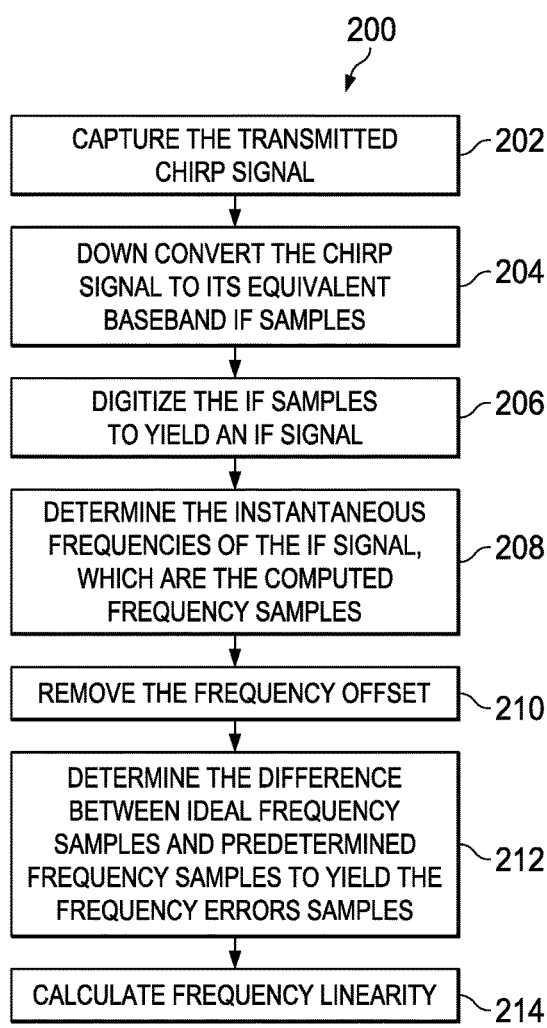
FIG. 2 is a flowchart describing an embodiment of measuring chirp signal linearity of a transmitted chirp signal.

Additional reference is made to FIG. 2, which is a flowchart 200 describing an embodiment of determining chirp signal linearity of a transmitted chirp signal. In step 202, the transmitted chirp signal is captured. In some examples the chirp signal is captured using a generic signal analyzer. For example, commonly available spectrum analyzers may be used to capture the transmitted chirp signals. The spectrum analyzers further function as signal analyzers even with high bandwidth chirp signals because they down-convert the chirp signal using their own internal or locally produced local oscillator (LO). The chirp signal is down-converted to its equivalent base-band intermediate frequency (IF) samples in step 204 and is digitized to yield a digitized IF signal, which is referred to as the IF signal in step 206.

The IF signal is quadrature in nature (typically digital I and Q samples). The bandwidth of the spectrum analyzer may or may not accommodate the bandwidth of the transmitted chirp signal, so the analysis bandwidth of the spectrum analyzer may be set to its maximum value in order to analyze the greatest portion of the chirp signal as possible. In some examples, the analysis bandwidth of the spectrum analyzer is approximately 40 MHz.

The amplitude of the digitized quadrature samples that are captured by the spectrum analyzer are chosen in a way that it does not clip or saturate the dynamic range of the digitizer and so that the digitized quadrature samples are not buried under the noise floor of the digitizer. The amplitude selected should be optimal and should be in the linear range of operation of the digitizer. In some examples the IF signal is processed to compute the phase of the IF signal. The derivative of the phase of the IF signal with respect to time is calculated to yield the instantaneous frequencies of the chirp signal. In step 208, the instantaneous frequencies of the chirp signal are determined, which are sometimes referred to as the computed frequency samples.

The computed frequency samples can have frequency offsets caused by the frequency difference between the transmitter's LO frequency, which is typically the chirp signal's LO, and the receiving equipment's LO. The difference in the starting frequency of the chirp signal, as captured by the equipment, and the actual start frequency used for the transmission of the chirp signal 100 can also cause a frequency offset. The frequency offset may be removed at step 210, by conventional techniques.

Ideal frequency samples of the computed frequency samples are determined from the computed frequency samples. In some examples this is determined by applying a linear fit in the form of a first order polynomial fit, which may include simple terms such as slope and intercept, to the computed frequency samples. In some examples, the polynomial for the polynomial fit is f(t)=at +b, where 'f' is the ideal frequency samples, 't' is the time base; 'a' is slope, and 'b' is the intercept. All the variables are the polynomial coefficients that give the best fit for the computed frequency samples.

Predetermined frequency samples are frequency samples based on a mathematical model of the chirp signal. The difference between the ideal and predetermined frequency samples are determined in step 212 to yield the frequency error samples. Frequency linearity is calculated in step 214 from the frequency error samples. In some examples, statistical operations such as mean standard deviation on the frequency error samples yield a measure of the frequency linearity.

Having described process for measuring frequency linearity, processes for measuring dynamic phase noise will now be described. The dynamic phase noise is continually analyzed over the bandwidth of the chirp signal and is specified at one particular offset frequency. In some examples, the dynamic phase noise is referred as being offset 100 KHz, 1 MHz, and 10 MHz from the carrier signal. In the case of FMCW radar, the carrier signal is not a single CW frequency, but constantly changes. For example, it may be the ramp signal shown in FIG. 1 that is specified over a particular bandwidth. Hence, the dynamic phase noise is specified as the phase noise of the ramp at an offset frequency, such as 10 KHz, 1 MHz, or 10 MHz.

Figure 3:
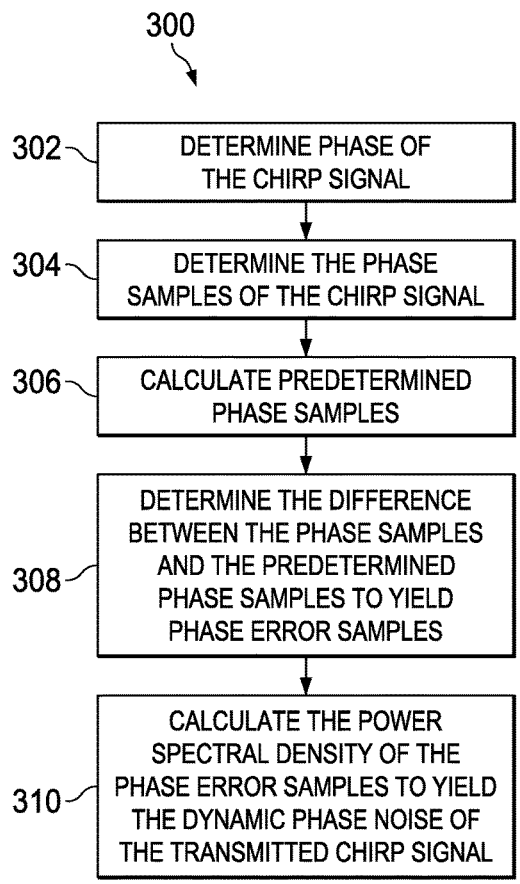
FIG. 3 is a flowchart describing an embodiment of measuring dynamic phase noise of a transmitted chirp signal.

FIG. 3 is a flowchart 300 describing an embodiment for determining the dynamic phase noise of a transmitted chirp signal. Phase of the chirp signal is determined at step 302. Phase samples of the chirp signal are determined at step 304. Phase samples can either be computed from the frequency samples or from the phase computed from the digitized I and Q samples. In the former case, the frequency error samples are integrated or summed up and divided by $2\pi$ to yield phase error samples. In the latter case, a linear polynomial fit (similar to linear fit on the computed frequency samples) is applied to compute phase samples. An example of the polynomial used is as follows: $\Phi(t)$ at+b, where $\Phi$ is the phase samples of the chirp signal, 't' is the time base; 'a' is slope, and 'b' is the intercept. These variables are the polynomial coefficients that give best fit for the phase samples, which is sometimes referred to as the measured phase samples.

Predetermined phase samples are calculated in step 306. The predetermined phase samples are based on a mathematical model of an ideal chip signal. The difference between the phase samples and the predetermined phase samples is determined at step 308 to yield phase error samples. The power spectral density function of the phase error samples is calculated in step 310 to yield the dynamic phase noise of the transmitted chirp signal. The power spectral density of the phase error samples may be used to compute the noise power over a certain frequency offset.

Figure 4:
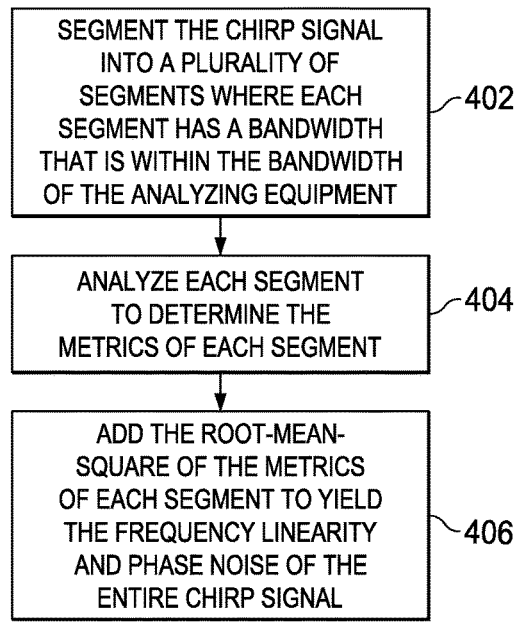
FIG. 4 is a flowchart describing the procedure to compute the metrics of a chirp signal in situations where the chirp signal bandwidth cannot be accommodated by the analyzing equipment.

FIG. 4 is a flowchart 400 describing a procedure for computing the metrics of a chirp signal in situations where the chirp signal bandwidth cannot be accommodated by the analyzing equipment. In summary, the entire bandwidth of the chirp signal is segmented into segments whereby each segment is analyzed. In this example, the chirp signal has the following characteristics:

transmitted chirp signal bandwidth: 70.3 MHz
chirp start frequency: 2.375 GHz
chirp stop frequency: 2.445 GHz
equipment bandwidth: 40 MHz
number of segments: 2
segmented bandwidth: 35 MHz
segment 1 start and stop frequencies: 2.375-2.41 GHz
segment 2 start and stop frequencies: 2.411-2.445 GHz As described above, the chirp signal bandwidth is greater than the bandwidth of the device or equipment analyzing the chirp signal. In step 402, the bandwidth of the chirp signal is segmented into a plurality of segments whereby each segment has a bandwidth that is within the bandwidth of the analyzing equipment. In the example described herein, the bandwidth of the chirp signal is segmented into halves of equal bandwidth which are within the bandwidth of the analyzing equipment. The segmented halves start and stop frequencies are entered into the analyzing equipment to extract the digitized IQ samples for each segment. In step 404, each segment of the chirp signal is analyzed per FIGS. 2 and 3 to determine the metrics of each segment. With regard to the metrics described above, the first segment and the second segment are analyzed individually to determine their metrics. In step 406, the root-mean-square of the metrics of each segment are added together to yield the metrics of the entire chirp signal. The metrics include the frequency linearity and the phase noise.

Figure 5:
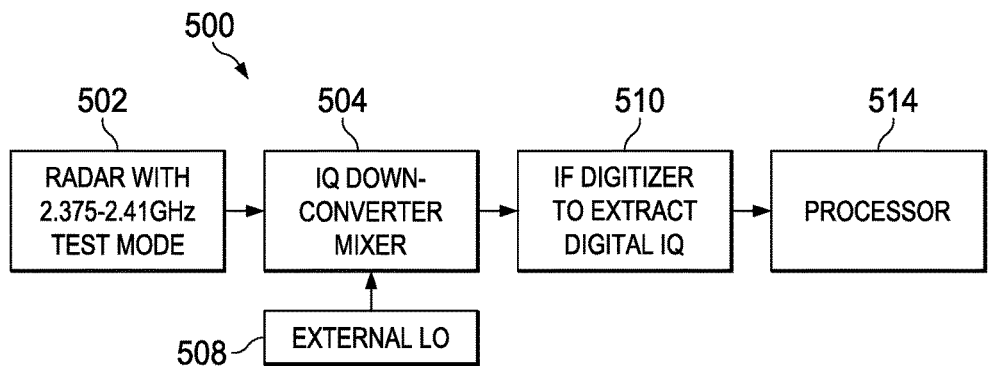
FIG. 5 is a block diagram of test equipment that measures frequency linearity and dynamic phase noise of a radar.

FIG. 5 is a block diagram of test equipment 500 that measures frequency linearity and phase noise of a radar 502. In some examples, the test equipment 500 is automated and measures the frequency linearity and phase noise of the radar 502 during production of the radar 502. The radar 502 has a test mode that outputs a chirp signal. In the example of FIG. 5, the chirp signal has a start frequency of 2.375 GHz and stop frequency of 2.41 GHz. The test equipment 500 includes an IQ down-converter mixer 504 that is coupled to the output of the radar 502. The IQ down-converter mixer 504 is coupled to an external local oscillator 508 that provides a mixing signal for the IQ down-converter mixer 504. In the example of FIG. 5, the frequency of the local oscillator is 2.5 GHz. The mixed signal output by the IQ down-converter mixer 504 is output to an intermediate frequency (IF) digitizer 510 that extracts the digital IQ signal from the mixed signal generated by the IQ down-converter mixer 504. The combination of the IQ down-converter 504 and the IF digitizer 510 serves a similar function as a conventional signal analyzer. A processor 514 analyzes the digitized IQ signals generated by the IF digitizer 510 and determines the frequency linearity and dynamic phase noise of the chirp signal per the methods illustrated in FIGS. 2 and 3.

The IQ down-converter 504 receives its input in the form of a chirp signal generated by the radar 502. The chirp signal in the examples provided herein is in the frequency range of 2.375 GHz to 2.51 GHz. The chirp signal is mixed with the external LO generated by the local oscillator 508 to yield a zero IF signal. The zero IF signal is passed through the IF digitizer 510 to produce digitized quadrature (IQ) samples. The signal processing techniques described herein can be applied on the zero IF signals by the processor 514 to evaluate frequency linearity and dynamic phase noise as described above.

Figure 6:
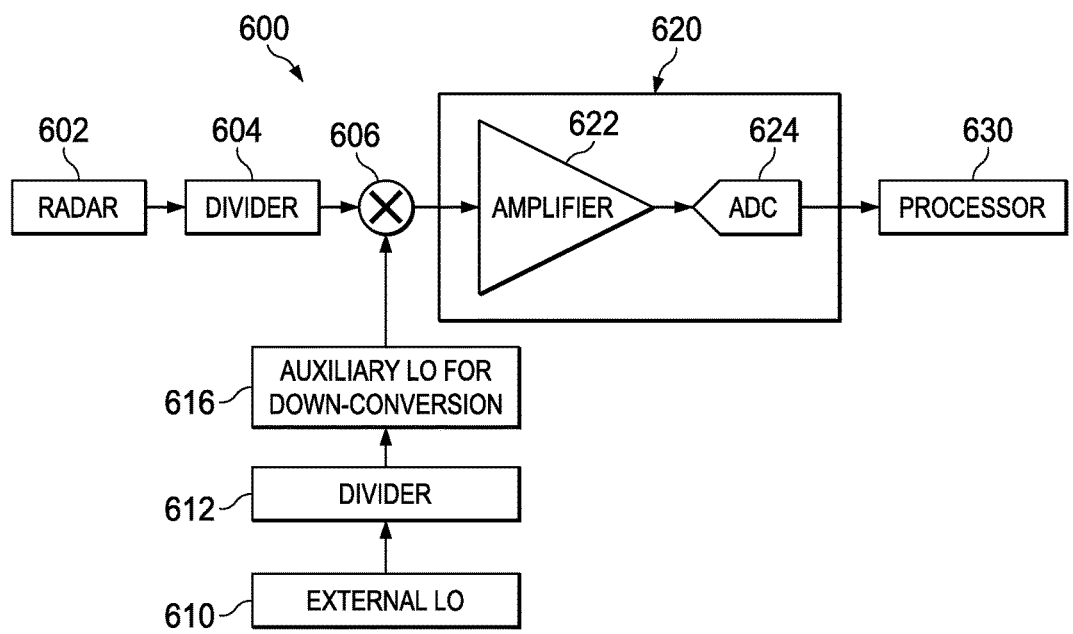
FIG. 6 is a block diagram of an embodiment of more detailed test equipment 500 that measures the frequency linearity and dynamic phase noise of a chirp signal.

FIG. 6 is a block diagram of an embodiment of more detailed test equipment 600 that measures the frequency linearity and dynamic phase noise of a chirp signal. In some examples, the measurements are achieved on a single integrated circuit chip or by way of a single circuit. A chirp signal having a defined configuration, such as slope, bandwidth, start frequency, and stop frequency, is transmitted from a radar 602. The frequencies of the chirp signal are scaled down by a divider 604. Scaling down the frequencies of the chirp signal accommodates simpler design of the devices described below. In the example of FIG. 6, the scaling is accomplished by a divider 604 that can divide the chirp signal down by a plurality of possible values, such as 2, 4, 8, 16, and 32.

The output of the divider 604 is coupled to an input of an auxiliary mixer 606 that is used for the down-conversion process. In the example of FIG. 6, the auxiliary mixer 606 is a complex mixer or a quadrature mixer. An external LO 610 generates a signal that has the same frequencies as the radar 602. In the embodiment of FIG. 6, the external LO 610 generates frequencies in the range of 76 GHz to 81 GHz. The output of the external LU 610 is input to a divider 612 that may be the same or substantially similar to the divider 604. For example, the divider 612 may reduce the frequency of the external LO 610 the same as the divider 604 reduces the signal output by the radar 602. The output of the divider 612 is input to an auxiliary LU 616 that is used for down-conversion. The output of the auxiliary LU 616 is input to the mixer 606.

The output of the mixer 606 is coupled to a receiver 620 that includes an IF amplifier 622 and an ADC 624. In some examples, the IF amplifier 622 is a two-staged, bi-quad IF amplifier that amplifies the output of the auxiliary mixer 606. The output of the amplifier 622 is digitized by the ADC 624. The output of the ADC 624 is processed by a processor 630 per the methods described in the flowcharts 200 and 300 of FIGS. 2 and 3. In some examples, the processing of the processor 630 is performed on the same circuit or integrated circuit as the other portions of the radar 602, so the processing can be absorbed as a part of software/firmware written to characterize the radar 602. For example, the processing may be performed as a self test process in the radar.

The LO used for the radar 602 cannot be used to feed the auxiliary mixer 606 and the external LO 610 because the phase noise gets cancelled out during the down-conversion and will affect the dynamic phase noise measurement. This problem is overcome by feeding the external LO 610 from an external source. The use of other internal clocks may create noise that will adversely affect the above-described measurements.

Many laboratory testing devices do not have the capability to measure dynamic phase noise of a chirp signal as described above. The chirp signal frequency linearity measurement typically requires high-end test equipment. The methods and devices described herein overcome the problems associated with measuring the frequency linearity and dynamic phase noise together by using a combination of a generic signal analyzer and signal processing algorithms.

Figure 7:
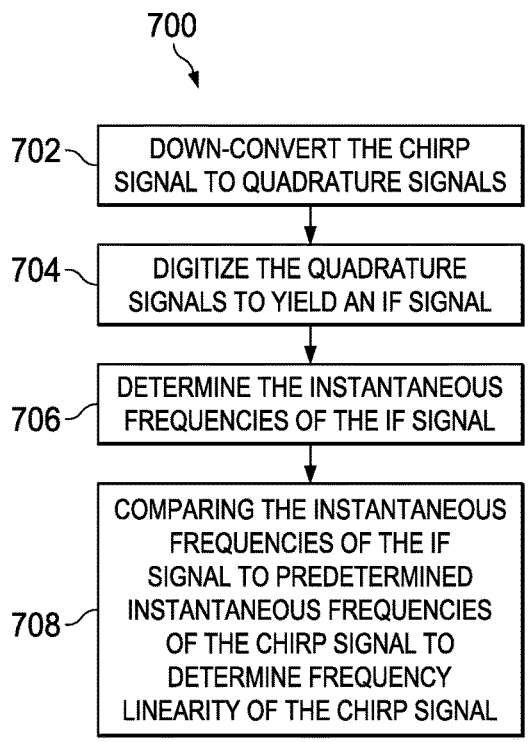
FIG. 7 is flowchart describing a method for determining frequency linearity of a chirp signal.

FIG. 7 is flowchart 700 describing a method for determining frequency linearity of a chirp signal. The method includes down-converting the chirp signal to quadrature signals at step 702. At step 704 the quadrature signals are digitized to yield an IF signal. At step 706 the instantaneous frequencies of the IF signal are determined. At step 708, the instantaneous frequencies of the IF signal are compared to predetermined instantaneous frequencies of the chirp signal to determine frequency linearity of the chirp signal.

Figure 8:
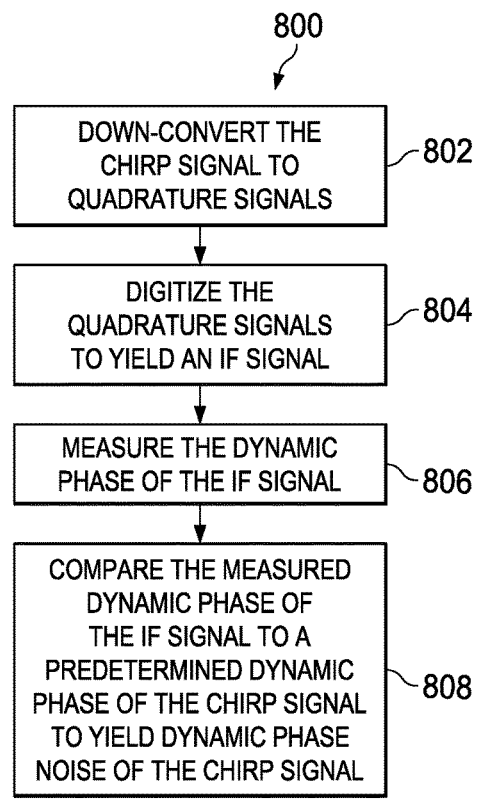
FIG. 8 is a flowchart describing a method for determining dynamic phase noise of a chirp signal.

FIG. 8 is a flowchart 800 describing a method for determining dynamic phase noise of a chirp signal. The method includes down-converting the chirp signal to quadrature signals at step 802. The method also includes digitizing the quadrature signals to yield an IF signal at step 804; measuring the dynamic phase of the IF signal at step 806; and comparing the measured dynamic phase of the IF signal to a predetermined dynamic phase of the chirp signal to yield dynamic phase noise of the chirp signal at step 808.

While some examples of radar and radar testing have been described in detail herein, it is to be understood that the inventive concepts may be otherwise variously embodied and employed and that the appended claims are intended to be construed to include such variations except insofar as limited by the prior art.

What is claimed is:

1. A method, comprising:
   down-converting to quadrature signals a chirp signal generated by a frequency modulated continuous wave (FMCW) radar;
   digitizing the quadrature signals to yield an intermediate frequency (IF) signal;
   determining instantaneous frequencies of the IF signal; and
   comparing in a processor the instantaneous frequencies of the IF signal to predetermined instantaneous frequencies of the chirp signal to determine frequency linearity of the chirp signal.

2. The method of claim 1, wherein determining the instantaneous frequencies of the IF signal comprises calculating a derivative of the IF signal.

3. The method of claim 1, further comprising:
   calculating a derivative of a phase of the IF signal to yield the instantaneous frequencies of the IF signal;
   fitting the instantaneous frequencies to a line; and
   determining a difference between the line of the instantaneous frequencies and a line constituting predetermined instantaneous frequencies to yield the frequency linearity.

4. The method of claim 1, wherein the down-converting includes down-converting the chirp signal to quadrature signals using a spectrum analyzer.

5. The method of claim 1, further comprising determining a dynamic phase noise of the chirp signal.

6. The method of claim 1, further comprising determining dynamic phase noise by:
   calculating a derivative of a phase of the IF signal to yield instantaneous frequency samples of the IF signal;
   determining a difference between the instantaneous frequency samples and predetermined frequency samples to yield frequency error samples;
   integrating the frequency error samples to yield phase error samples; and
   calculating a power spectral density function of the phase error samples to yield dynamic phase noise.

7. The method of claim 1, further comprising determining dynamic phase noise by:
   determining phase samples of the IF signal;
   calculating predetermined phase samples;
   determining a difference between the phase samples to the predetermined phase samples to yield phase error samples; and
   determining a power spectral density of the phase error samples to yield dynamic phase noise.

8. The method of claim 1, further comprising:
   analyzing a plurality of bandwidths constituting the chirp signal; and combining results of analyzing the plurality of bandwidths to yield an analysis of the chirp signal.

9. A method of analyzing a chirp signal generated by a FMCW radar, the method comprising:
down-converting the chirp signal to quadrature signals;
digitizing the quadrature signals to yield an intermediate frequency (IF) signal;
measuring a dynamic phase of the IF signal; and
comparing the measured dynamic phase of the IF signal to a predetermined dynamic phase of the chirp signal to yield dynamic phase noise of the chirp signal.

10. The method of claim 9, further comprising calculating a power spectral density of phase error samples, whereby the power spectral density of the phase error samples yields dynamic phase noise of the chirp signal.

11. The method of claim 9, wherein phase error samples are determined by fitting a linear polynomial to the measured dynamic phase samples and taking a difference between the linear polynomial and a linear polynomial of the predetermined dynamic phase.

12. The method of claim 9, further comprising determining frequency linearity of the chirp signal.

13. The method of claim 12, wherein determining the frequency linearity comprises:
calculating a derivative of the phase of the IF signal to yield instantaneous frequency samples of the chirp signal;
fitting the instantaneous frequency samples to a line; and
determining a difference between the instantaneous frequency samples and a line constituting predetermined frequency samples to yield the frequency linearity.

14. The method of claim 9, wherein determining phase error samples comprises:
calculating a derivative of the phase of the IF signal to yield instantaneous frequencies of the chirp signal;
determining a difference between the instantaneous frequencies and predetermined frequencies to yield frequency error; and
integrating the frequency error to yield the phase error samples.

15. The method of claim 9, wherein the down-converting is performed with a spectrum analyzer.

16. The method of claim 9, further comprising:
analyzing a first bandwidth of the chirp signal;
analyzing a second bandwidth of the chirp signal; and
combining results of analyzing the first bandwidth and analyzing the second bandwidth to yield an analysis of the chirp signal.

17. A testing device for FMCW radar, the testing device comprising:
an input for receiving a chirp signal generated by the radar;
an IQ down-converter coupled to the input for down-converting the chirp signal;
a digitizer for extracting digitized IQ signals from the down-converted chirp signal; and
a processor coupled to the digitizer for determining at least one of frequency linearity and phase noise of the chirp signal.

18. The testing device of claim 17, wherein the IQ down-converter is an IQ down-converter mixer.

19. The testing device of claim 18, further comprising an oscillator coupled to the IQ down-converter mixer for providing a local oscillator frequency for down conversion performed by the IQ down-converter mixer.

20. The testing device of claim 17, wherein the IQ down-converter is a spectrum analyzer.

21. A testing device for FMCW radar, the testing device comprising:
an input for receiving a chirp signal generated by the radar;
an IQ down-converter coupled to the input for down-converting the chirp signal;
a digitizer for extracting digitized IQ signals from the down-converted chirp signal; and
a processor coupled to the digitizer for determining at least one of frequency linearity and phase noise of the chirp signal, whereby the processor determines instantaneous frequencies of the digitized IQ signals and compares them to predetermined frequencies to determine frequency linearity of the chirp signal.

22. A testing device for FMCW radar, the testing device comprising:
an input for receiving a chirp signal generated by the radar;
an IQ down-converter coupled to the input for down-converting the chirp signal;
a digitizer for extracting digitized IQ signals from the down-converted chirp signal; and
a processor coupled to the digitizer for determining at least one of frequency linearity and phase noise of the chirp signal, whereby the processor:
determines instantaneous frequencies of the digitized IQ signals; and
fits the instantaneous frequencies onto a line and compares the frequencies on the line to predetermined frequencies to determine frequency linearity of the chirp signal.

23. The testing device of claim 22, wherein the processor calculates derivatives of phases of the digitized IQ signals to determine the instantaneous frequencies.

24. An apparatus, comprising:
circuitry for down-converting to quadrature signals a chirp signal generated by a frequency modulated continuous wave (FMCW) radar;
circuitry for digitizing the quadrature signals to yield an intermediate frequency (IF) signal;
circuitry for determining instantaneous frequencies of the IF signal; and
a processor for comparing in a processor the instantaneous frequencies of the IF signal to predetermined instantaneous frequencies of the chirp signal to determine frequency linearity of the chirp signal.

25. The apparatus of claim 24, wherein determining the instantaneous frequencies of the IF signal comprises calculating a derivative of the IF signal.

26. The apparatus of claim 24, further comprising:
circuitry for calculating a derivative of a phase of the IF signal to yield the instantaneous frequencies of the IF signal;
circuitry for fitting the instantaneous frequencies to a line; and
circuitry for determining a difference between the line of the instantaneous frequencies and a line constituting predetermined instantaneous frequencies to yield the frequency linearity.

27. The apparatus of claim 24, wherein the down-converting includes down-converting the chirp signal to quadrature signals using a spectrum analyzer.

28. The apparatus of claim 24, further comprising circuitry for determining a dynamic phase noise of the chirp signal.

29. The apparatus of claim 24, further comprising:
circuitry for calculating a derivative of a phase of the IF signal to yield instantaneous frequency samples of the IF signal;
circuitry for determining a difference between the instantaneous frequency samples and predetermined frequency samples to yield frequency error samples;
circuitry for integrating the frequency error samples to yield phase error samples; and
circuitry for calculating a power spectral density function of the phase error samples to yield dynamic phase noise.

30. The apparatus of claim 24, further comprising:
circuitry for determining phase samples of the IF signal;
circuitry for calculating predetermined phase samples;
circuitry for determining a difference between the phase samples to the predetermined phase samples to yield phase error samples; and
circuitry for determining a power spectral density of the phase error samples to yield dynamic phase noise.

31. The apparatus of claim 24, further comprising:
circuitry for analyzing a plurality of bandwidths constituting the chirp signal; and
circuitry for combining results of analyzing the plurality of bandwidths to yield an analysis of the chirp signal.

* * * * *